(12) United States Patent
Morimoto et al.

(10) Patent No.: US 8,269,812 B2
(45) Date of Patent: Sep. 18, 2012

(54) IMAGE FORMING APPARATUS AND CLEANING MEMBER FOR EXPOSURE HEAD

(75) Inventors: Daiki Morimoto, Saitama (JP); Tetsuya Sakamoto, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 454 days.

(21) Appl. No.: 12/541,427

(22) Filed: Aug. 14, 2009

(65) Prior Publication Data
US 2010/0245525 A1    Sep. 30, 2010

(30) Foreign Application Priority Data
Mar. 27, 2009 (JP) ................. 2009-078097

(51) Int. Cl.
*B41J 15/14* (2006.01)
*B41J 27/00* (2006.01)
*G03G 21/00* (2006.01)

(52) U.S. Cl. .................. 347/257; 347/242; 399/98
(58) Field of Classification Search ............ 347/257; 399/98
See application file for complete search history.

(56) References Cited

U.S. PATENT DOCUMENTS

| | | | |
|---|---|---|---|
| 7,020,417 B2 * | 3/2006 | Nomura et al. | 399/111 |
| 7,277,655 B2 * | 10/2007 | Namba | 399/98 |
| 7,528,855 B2 * | 5/2009 | Namba | 347/241 |
| 7,787,005 B2 * | 8/2010 | Nomura et al. | 347/241 |
| 7,872,664 B2 * | 1/2011 | Yamakawa et al. | 347/241 |
| 2005/0012973 A1 | 1/2005 | Sowa et al. | 359/198 |
| 2007/0024943 A1 | 2/2007 | Namba | 359/216 |
| 2009/0009867 A1 | 1/2009 | Sowa et al. | 359/507 |

FOREIGN PATENT DOCUMENTS

| | | |
|---|---|---|
| JP | 60-100131 A | 6/1985 |
| JP | 63-29166 U | 2/1988 |
| JP | 2-150882 A | 6/1990 |
| JP | 3-49573 U | 5/1991 |
| JP | 2001-343876 A | 12/2001 |
| JP | 2005-70395 A | 3/2005 |
| JP | 2006-106446 A | 4/2006 |
| JP | 2006-154500 A | 6/2006 |
| JP | 2006-218656 | 8/2006 |
| JP | 2006-276176 A | 10/2006 |
| JP | 2007-007232 | 1/2007 |
| JP | 2007-30399 A | 2/2007 |
| JP | 2007-240789 A | 9/2007 |
| JP | 2008-65337 A | 3/2008 |
| JP | 2008-145793 A | 6/2008 |

* cited by examiner

*Primary Examiner* — Stephen Meier
*Assistant Examiner* — Jeremy Bishop
(74) *Attorney, Agent, or Firm* — Morgan, Lewis & Bockius LLP

(57) ABSTRACT

The image forming apparatus includes: an image carrier; an exposure head provided along a longitudinal direction of the image carrier, and exposing the image carrier; a housing holding the exposure head; an opening portion formed in the housing, and opening toward a position through which the image carrier and the exposure head face each other; a receiving portion provided in the housing; and a cleaning member having one and different ends, and including: a cleaning portion provided on a one end side where the one end is located, and cleaning a light-emitting face of the exposure head by moving while keeping in contact with the light-emitting face; and a guiding portion coming in contact with the receiving portion and guiding the cleaning portion toward a space between the image carrier and the exposure head when the cleaning portion is inserted into an interior of the housing through the opening portion.

10 Claims, 9 Drawing Sheets

IMAGE FORMING APPARATUS AND CLEANING MEMBER FOR EXPOSURE HEAD

CROSS REFERENCE TO RELATED APPLICATIONS

This application is based on and claims priority under 35 USC §119 from Japanese Patent Application No. 2009-78097 filed Mar. 27, 2009.

BACKGROUND

1. Technical Field

The present invention relates to an image forming apparatus and a cleaning member for an exposure head.

2. Related Art

An exposure head has been used in an image forming apparatus as an exposure device that exposes an image carrier such as a photoconductor. The exposure head includes a large number of light-emitting elements arrayed therein and is disposed to face the image carrier. In such an image forming apparatus, adherence of floating toner and the like onto a light-emitting face of an exposure head results in occurrence of image quality unevenness, and decrease in the amount of light emission. In order to deal with this problem, there have been known image forming apparatuses configured to clean light-emitting faces of exposure heads thereof.

SUMMARY

According to an aspect of the present invention, there is provided an image forming apparatus including: an image carrier; an exposure head that is provided along a longitudinal direction of the image carrier, and exposes the image carrier; a housing that holds the exposure head; an opening portion that is formed in the housing, and that opens toward a position through which the image carrier and the exposure head face each other; a receiving portion that is provided in the housing; and a cleaning member having one end and a different end, and including: a cleaning portion that is provided on a one end side where the one end is located, and that cleans a light-emitting face of the exposure head by moving while keeping in contact with the light-emitting face; and a guiding portion that comes in contact with the receiving portion and guides the cleaning portion toward a space between the image carrier and the exposure head when the cleaning portion is inserted into an interior of the housing through the opening portion.

BRIEF DESCRIPTION OF THE DRAWINGS

Exemplary embodiment(s) of the present invention will be described in detail based on the following figures, wherein.

DETAILED DESCRIPTION

An exemplary embodiment of the present invention will be described below in detail with reference to the accompanying drawings.

Figure 1:
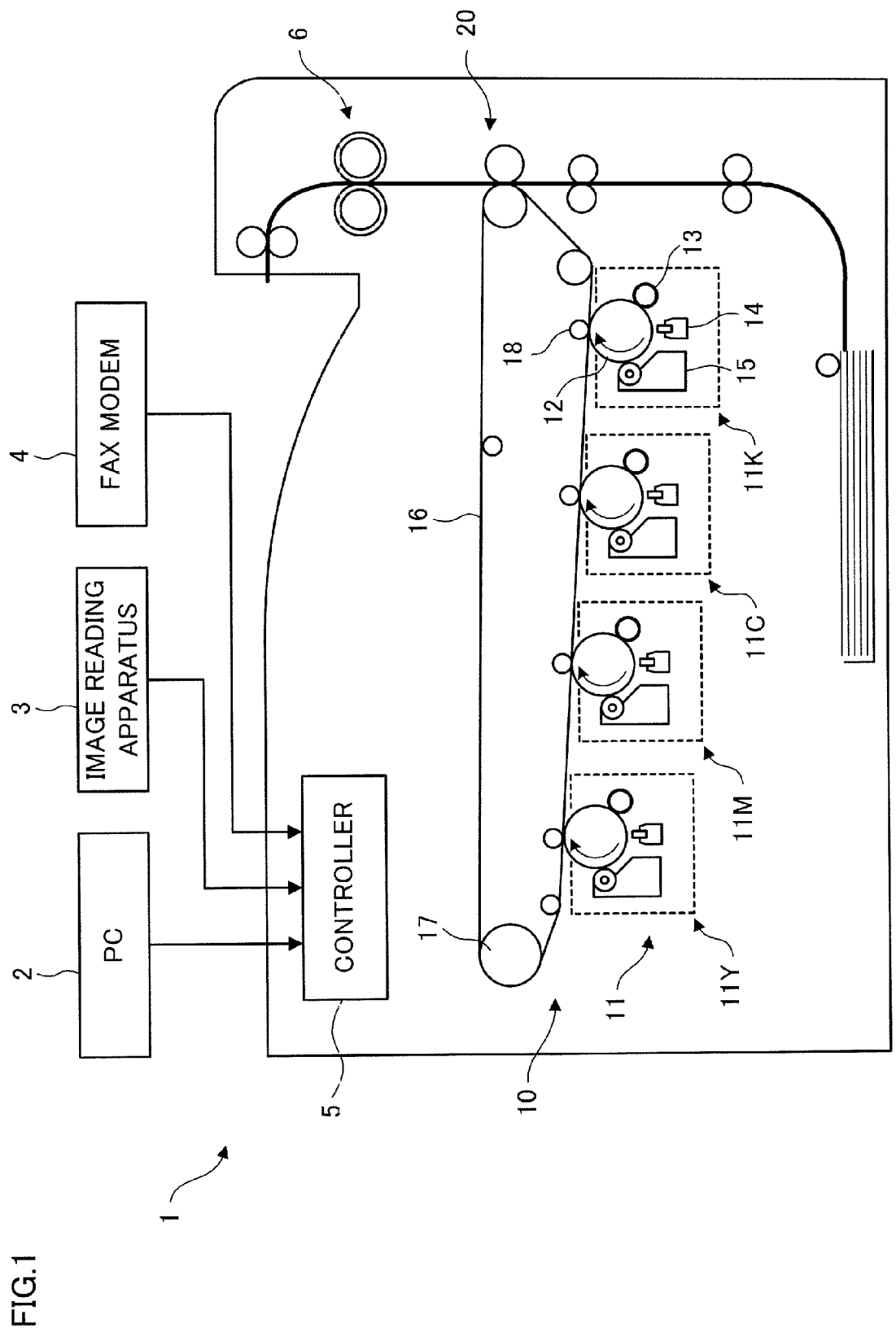
FIG. 1 is a view showing one example of an entire configuration of an image forming apparatus.

FIG. 1 is a view showing one example of an entire configuration of an image forming apparatus 1 to which the exemplary embodiment is applied.

The image forming apparatus 1 includes: an image formation process unit 10 that performs image formation in accordance with image data of respective colors; and a controller 5 that is connected to a personal computer (PC) 2, an image reading apparatus 3, a facsimile (FAX) modem 4 or the like, that applies image processing on image data inputted therefrom, and moreover, that entirely controls operations of the image forming apparatus 1.

The image formation process unit 10 of the present exemplary embodiment includes four image forming units 11 (which are, specifically, image forming units 11Y, 11M, 11C and 11K). Additionally, the image formation process unit 10 includes: an intermediate transfer belt 16 to which the color toner images are sequentially transferred (primarily transferred) to be carried thereon, the toner images being formed by photoconductive drums 12 of the image forming units 11, respectively; a driving roll 17 that drives the intermediate transfer belt 16; primary transfer rolls 18 that transfer, onto the intermediate transfer belt 16, the respective toner images carried by the photoconductive drums 12; a secondary transfer roll 20 that secondarily transfers, on a paper sheet, the superimposed toner images transferred onto the intermediate transfer belt 16; and a fixing device 6 that heats and pressurizes the unfixed toner images on the paper sheet after the transfer, thereby fixing the unfixed toner images.

Figure 2:
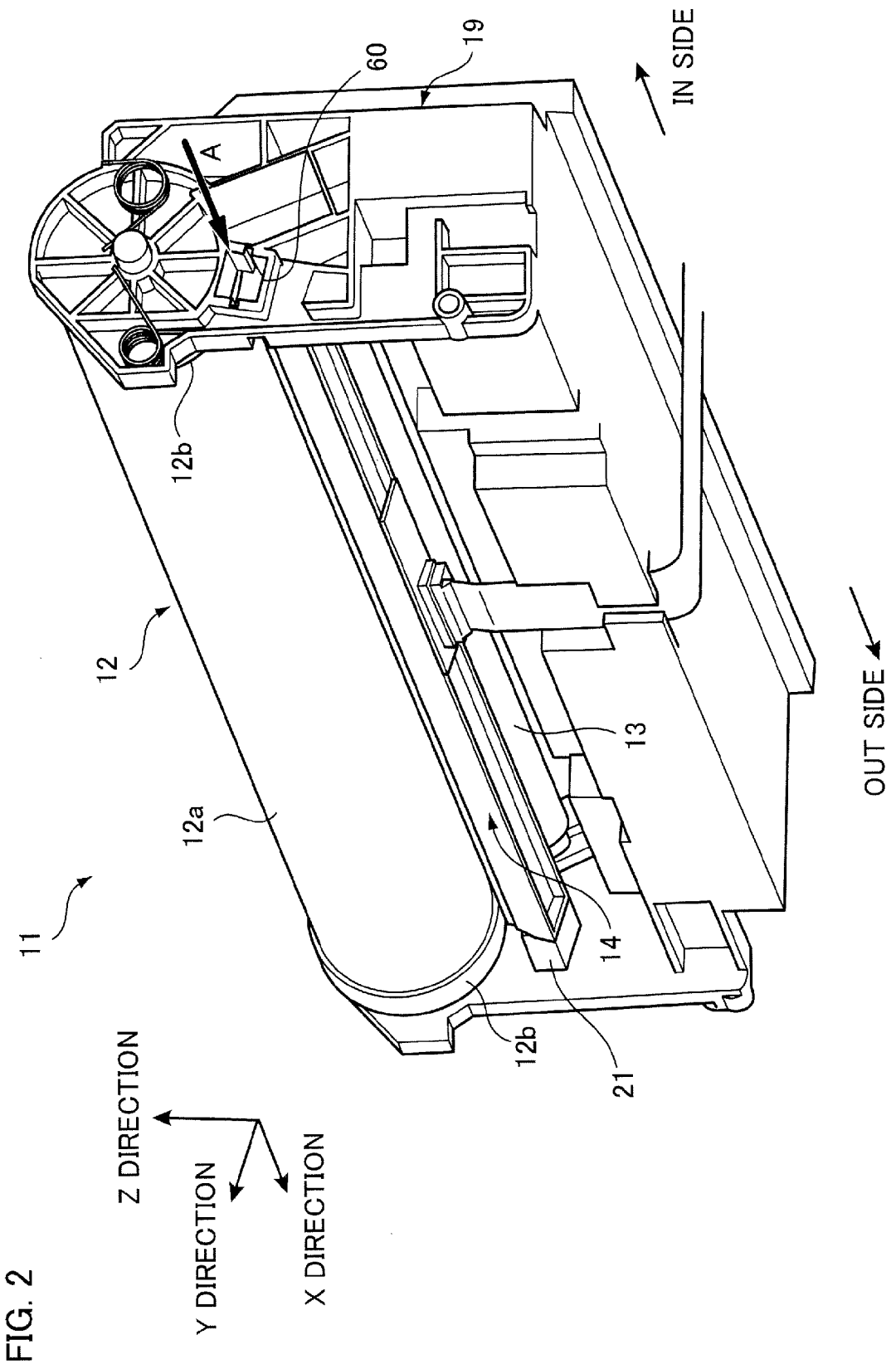
FIG. 2 is a perspective view of each of the image forming units to which the exemplary embodiment is applied.

FIG. 2 is a perspective view of each of the image forming units 11 to which the exemplary embodiment is applied. Note that illustration of a developing device 15 is omitted in FIG. 2.

Each of the image forming units 11 includes: the photoconductive drum 12; a charging device 13 that electrically charges the photoconductive drum 12; an LED print head (LPH) 14 that exposes the electrically charged photoconductive drum 12 on the basis of image data transmitted thereto from the controller 5; and the developing device 15 (refer to FIG. 1) that develops, with toner, an electrostatic latent image formed on the photoconductive drum 12. Additionally, the image forming unit 11 includes a housing 19 as one example of a housing that holds these elements which are the photoconductive drum 12, the charging device 13, the LPH 14 and the developing device 15. Moreover, an insertion opening 60 used for inserting a later described cleaning member 50 is provided in the housing 19 as shown in FIG. 2.

The photoconductive drum 12 provided as one example of an image carrier includes: a photoconductive base 12a obtained by forming a photoconductive layer on a tubular base; and flange members 12b provided respectively on both ends of this photoconductive base 12a. A gear that transmits rotation driving force to the photoconductive base 12a, a shaft that works as a rotational axis of the photoconductive drum 12, and the like are provided to each of the flange members 12b. Thereby, the photoconductive drum 12 is held by the housing 19, and rotates by receiving the rotation driving force from a driving unit not shown in the figure. Note that the flange members 12b of the present exemplary embodiment protrude farther than a surface of the photoconductive base 12a of the photoconductive drum 12, as shown in FIG. 2.

As shown in FIG. 2, the LPH 14 provided as one example of an exposure head has a shape with a long dimension extending along a direction of a rotational axis of the photoconductive drum 12. Additionally, both ends of the LPH 14 are held by holding portions 21 provided to an inner side of the housing 19, whereby a position thereof relative to the photoconductive drum 12 is fixed. Specifically, the LPH 14 is attached so that a longitudinal direction thereof may extend along the direction of the rotational axis of the photoconductive drum 12. Moreover, a distance between the LPH 14 and the photoconductive drum 12 in a light irradiation direction is specified on the basis of a distance allowing irradiation light from the LPH 14 to form an image on the surface of the photoconductive drum 12 (the photoconductive base 12a) (refer to FIG. 5 described later).

In the present exemplary embodiment, as will be described later, the LPH 14 is cleaned by use of the cleaning member 50. Additionally, the cleaning member 50 is provided as a body that is separated from the image forming unit 11. Therefore, as shown by an arrow A in FIG. 2, the insertion opening 60 is formed in the housing 19 so that the cleaning member 50 may be inserted from the outside of the image forming unit 11 (the housing 19) toward an interior of the housing 19. Note that this insertion opening 60 will be described later in detail.

Additionally, in the following description, as shown in FIG. 2, the longitudinal direction (a first scanning direction) of the LPH 14 is set as an X direction, an optical axis direction (the light irradiation direction) of light emitted toward the photoconductive drum 12 from the LPH 14 is set as a Z direction, and a direction orthogonal to these X and Z directions is set as a Y direction. Furthermore, along the X direction of the LPH 14 shown in FIG. 2, the front side and the rear side in the paper will be referred to as the IN side and as the OUT side, respectively. Additionally, when each of the members and the like is described below, one side thereof corresponding the rear side in the paper is to be set as the OUT side, and the other side thereof corresponding to the front side in the paper is to be set as the IN side, in a state where the members are attached to the image forming unit 11 shown in FIG. 2.

Figure 3:
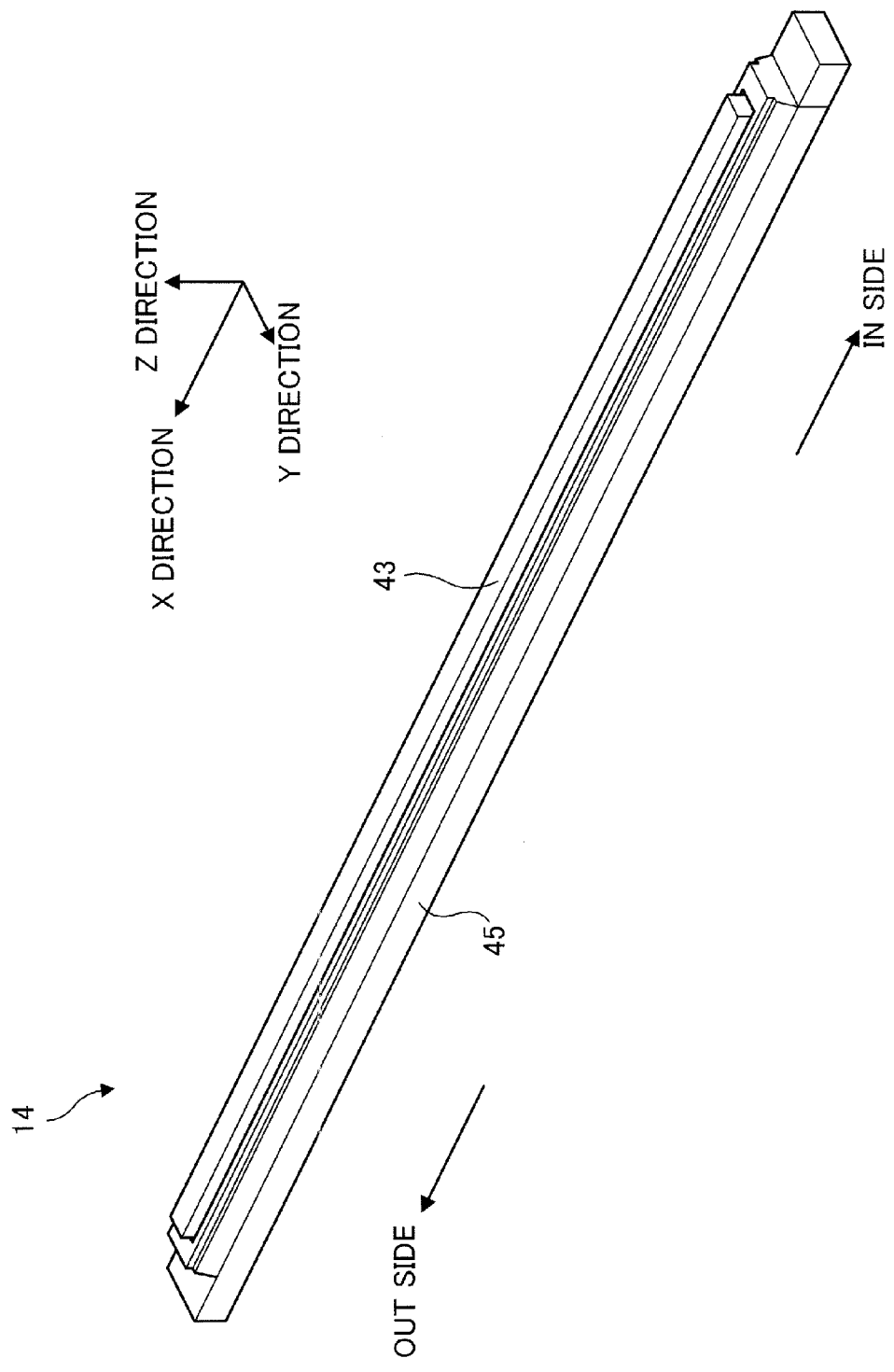
FIG. 3 is a view showing one example of an entire configuration of the LPH.

FIG. 3 is a view showing one example of an entire configuration of the LPH 14. FIG. 3 is a perspective view of the LPH 14 viewed from a light irradiation side thereof.

As shown in FIG. 3, the LPH 14 includes: a light-emitting chip array 41 (refer to FIG. 4A described later); a rod lens array 43 that causes light to form an image on the surface of the photoconductive drum 12, the light being emitted from the light-emitting chip array 41; and a holder 45 that supports the light-emitting chip array 41 and the rod lens array 43, and, at the same time, blocks the light-emitting chip array 41 from the outside.

Figure 4A:
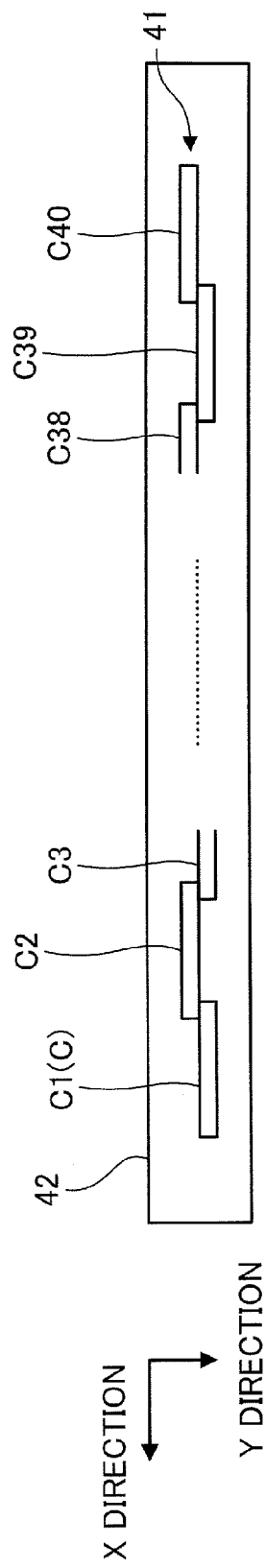
FIGS. 4A and 4B are views for explaining members forming the LPH.
Figure 4B:
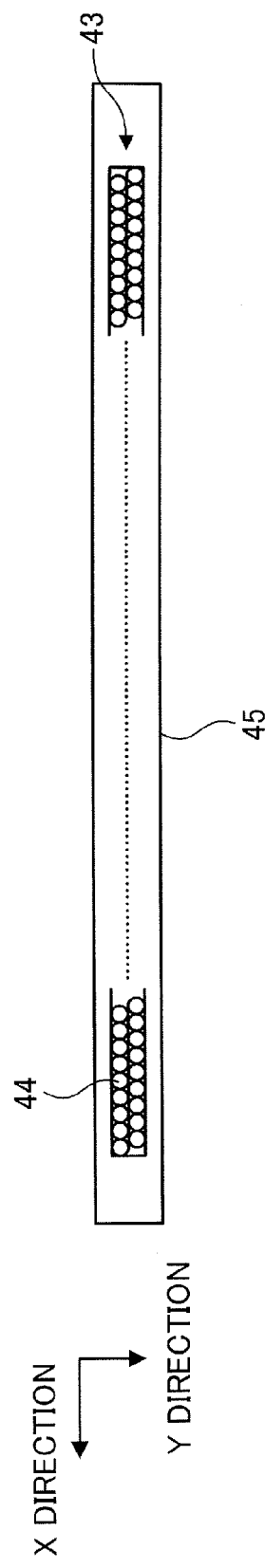

FIGS. 4A and 4B are views for explaining members forming the LPH 14. FIG. 4A is a top view of the light-emitting chip array 41 in the LPH 14, and FIG. 4B is a top view of the rod lens array 43 and the holder 45 in the LPH 14.

The light-emitting chip array 41 includes a circuit board 42 on which light-emitting chips C each provided with plural LEDs, signal generation circuits that drive the respective light-emitting chips C, various interconnections, and the like are provided. Additionally, as shown in FIG. 4A, the light-emitting chip array 41 is configured by the 40 light-emitting chips C (C1 to C40) arranged zigzag in two lines in the Y direction on the circuit board 42.

On the other hand, as shown in FIG. 4B, the rod lens array 43 is configured by plural rod lenses 44 held by the holder 45 in a state where the plural rod lenses 44 are alternately arranged in two lines in the Y direction. Each of the rod lenses 44 has, for example, a cylindrical shape, and is formed of a gradient index lens that forms an erect unmagnified image by having a refractive-index distribution in a radius direction thereof. For example, SELFOC Lens (trademark of Nippon Sheet Glass Co., Ltd.) is exemplified as such a gradient index lens.

Figure 5:
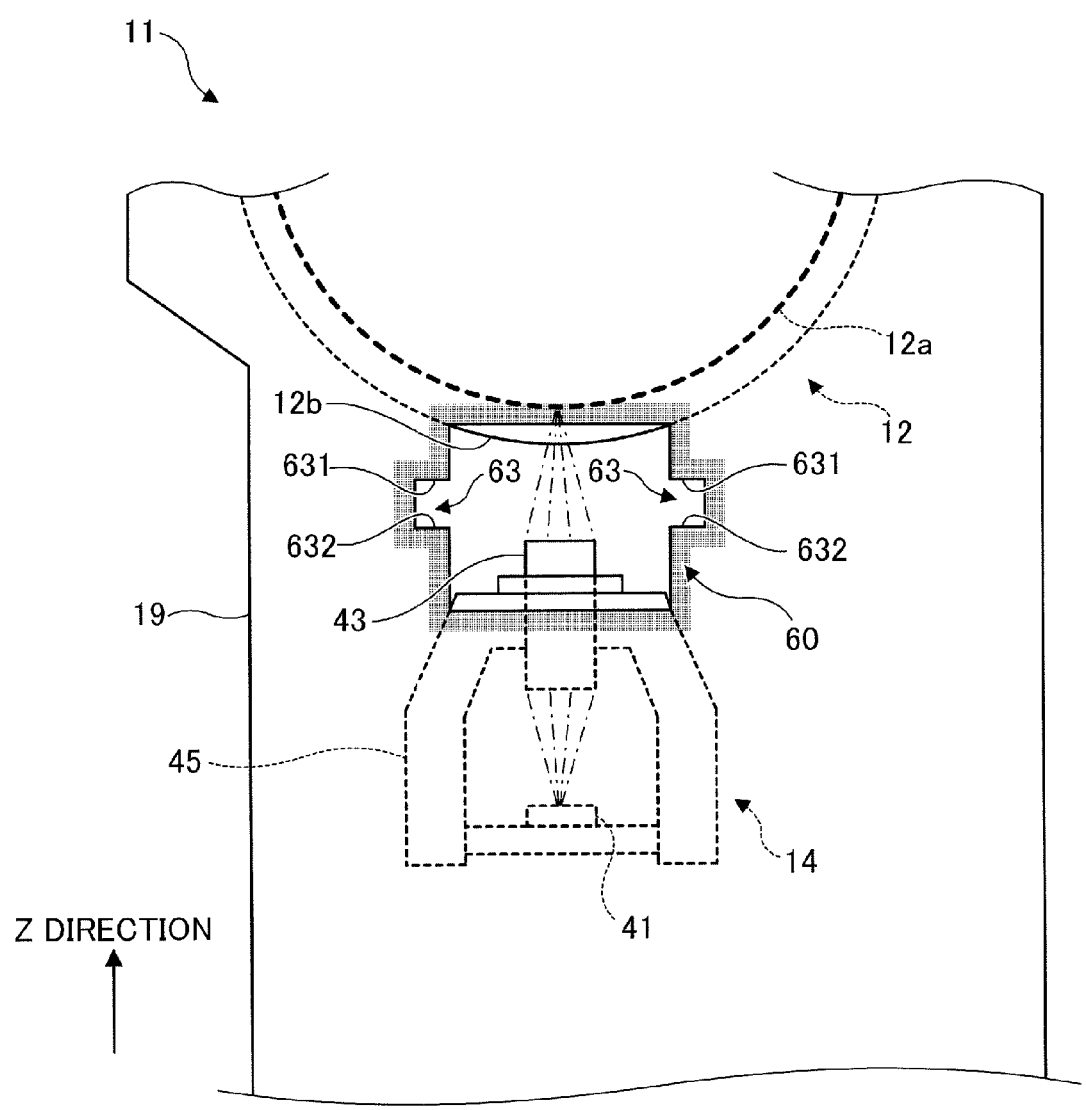
FIG. 5 is a view for explaining the insertion opening formed in the housing.

FIG. 5 is a view for explaining the insertion opening 60 formed in the housing 19. FIG. 5 is a side view around the insertion opening 60 viewed from the direction of the arrow A shown in FIG. 2.

In the present exemplary embodiment, the insertion opening 60 is formed in the housing 19 at an end portion on the IN side (refer to FIG. 2). As shown in FIG. 5, the insertion opening 60 provided as one example of an opening portion is an opening penetrating from an outer side of the housing 19 to an inner side thereof toward a region through which the photoconductive drum 12 and the LPH 14 face each other. Additionally, the opening that forms the insertion opening 60 is formed larger than a cross section of the later described cleaning member 50. Further, in the present exemplary embodiment, the cleaning member 50 is caused to enter into the interior of the housing 19 through the insertion opening 60, whereby a face (hereinafter, referred to as a light-emitting face) of the rod lens array 43 in the interior of the housing 19 is cleaned, the face facing the photoconductive drum 12.

Additionally, as shown in FIG. 5, receiving portions 63 are formed in the insertion opening 60. The receiving portions 63 are operable to guide a position of the cleaning member 50 in the Z direction while being in contact with later described guiding portions 54 of the cleaning member 50. The respective receiving portions 63 of the present exemplary embodiment are grooves formed in the opening in the insertion opening 60, as shown in FIG. 5. These grooves forming the receiving portions 63 are formed throughout a thickness direction of the housing 19 from the outer side of the housing 19 to the inner side. Note that, in the example shown in FIG. 5, one of the receiving portions 63 is formed in each of the right and left sides in the insertion opening 60.

The receiving portion 63 includes: a first contact face 631 facing toward a face facing the LPH 14; and a second contact face 632 facing toward a face facing the photoconductive drum 12. In addition, as will be described later, the first and second contact faces 631 and 632 determine a position of the cleaning member 50 in the Z direction while being in contact with the guiding portions 54 in the cleaning member 50. Specifically, the first contact face 631 of the receiving portion 63 restricts movement of the cleaning member 50 toward the photoconductive drum 12 in the Z direction. On the other hand, the second contact face 632 of the receiving portion 63 restricts movement of the cleaning member 50 toward the LPH 14 in the Z direction.

Additionally, as shown in FIG. 5, when the interior of the housing 19 is viewed through the insertion opening 60, it is recognized that an outer circumference portion of the flange member 12b of the photoconductive drum 12 overhangs at the photoconductive drum 12 side of the insertion opening 60. Furthermore, the rod lens array 43 side of the LPH 14 overhangs part, closer to the LPH 14, of the insertion opening 60.

Note that each of the receiving portions 63 is not required to be necessarily formed in the insertion opening 60 and may be formed separately and independently from the insertion opening 60, for example, on the outer side or the inner side of the housing 19. In the present exemplary embodiment, provision of the receiving portions 63 in the insertion opening 60 prevents the cleaning member 50 from getting stuck with the insertion opening 60 at the stage when the cleaning member 50 is inserted through the insertion opening 60.

Figure 6:
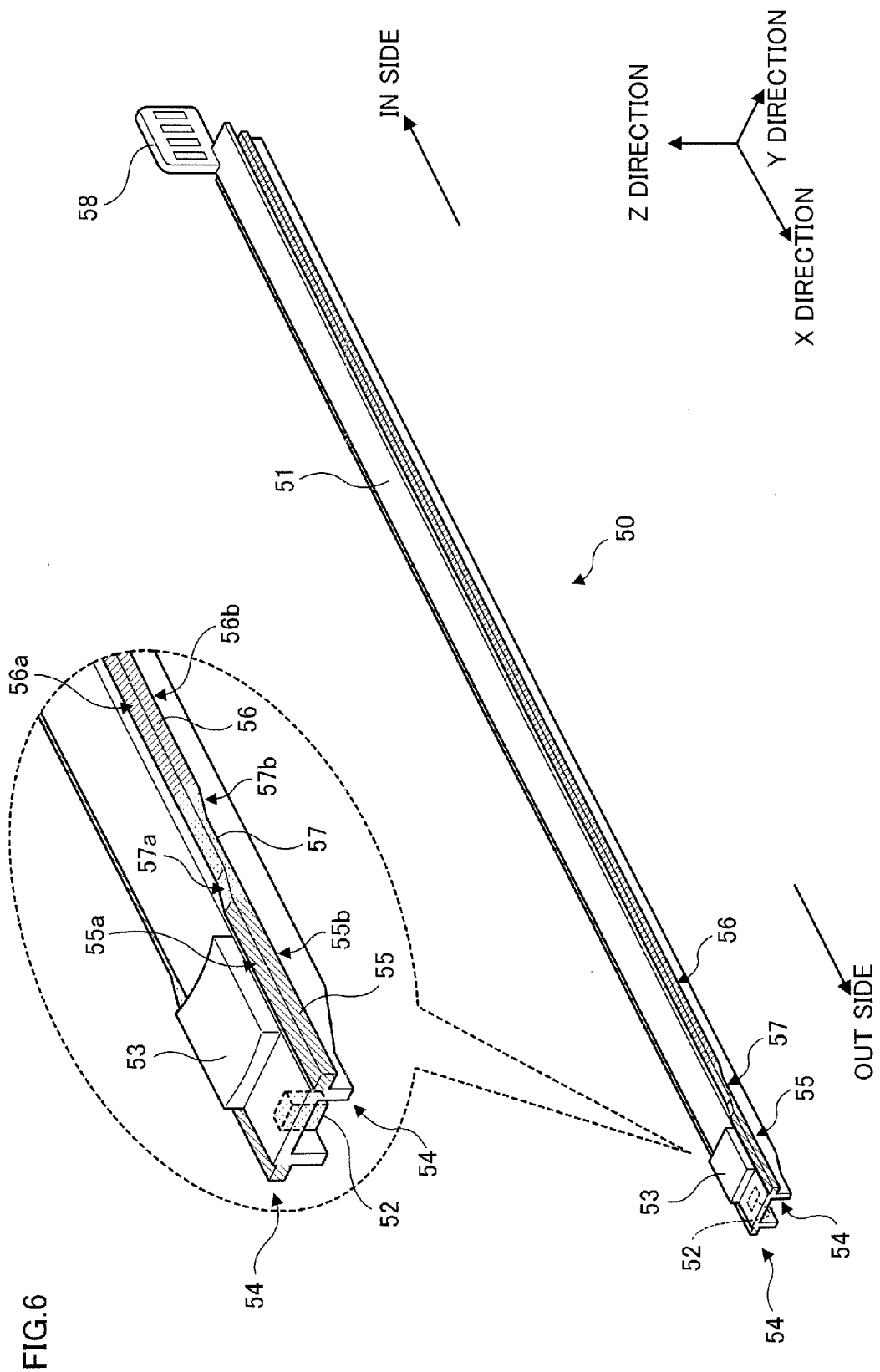
FIG. 6 is a view for explaining an entire configuration of the cleaning member.

FIG. 6 is a view for explaining an entire configuration of the cleaning member 50.

As shown in FIG. 6, the cleaning member 50 includes a base portion 51 provided as one example of a base, a blade 52 provided on the base portion 51, a protection member 53, the guiding portions 54 and a grip portion 58.

The base portion 51 of the present exemplary embodiment is a rod-like member. The base portion 51 has a length enough to project in the IN side of the housing 19 in a state where the base portion 51 is inserted through the insertion opening 60 into the housing 19 so as to reach the OUT side of the housing 19. By being thus configured, the base portion 51 is operated (pulled out and inserted) at one end side (which is, in the present exemplary embodiment, the IN side in which the insertion portion 60 is provided) of the housing 19, and cleans the rod lens array 43 of the LPH 14 over the entire length thereof.

The blade 52 provided as one example of a cleaning portion forms an end portion of the base portion 51, and is provided so as to, when being inserted into the insertion opening 60, project toward the LPH 14. By making contact with the rod lens array 43 of the LPH 14 and moving on the surface of the rod lens array 43, the blade 52 is operable to wipe out adhesion material, such as floating toner and foreign matter, having adhered onto the rod lens array 43. Additionally, for example, PET resin and the like are used as materials of the blade 52 of the present exemplary embodiment. Note that, in the following description, an end portion of the cleaning member 50 will be referred to as a tip portion of the cleaning member 50. Here, the end portion has the blade 52 attached thereto.

The protection member 53 is attached on the tip portion of the cleaning member 50 so as to, when being inserted into the insertion opening 60, face the photoconductive drum 12. That is, the protection member 53 is provided to the base portion 51 on a side which is opposite to a side where the blade 52 is provided. The protection member 53 is operable to protect the photoconductive drum 12 from being damaged when the photoconductive drum 12 is in contact with the cleaning member 50. Note that felt and the like are used as materials of the protection member 53 of the present exemplary embodiment.

The guiding portions 54 are formed along a longitudinal direction of the base portion 51 at side faces of the base portion 51. The guiding portions 54 are formed by providing linear projections on the side faces of the base portion 51 as shown in FIG. 6. Moreover, the guiding portions 54 are operable to determine a position of the tip portion of the cleaning member 50 in the Z direction while being in contact with the receiving portions 63 formed in the insertion opening 60. Additionally, in the present exemplary embodiment, the guiding portions 54 are respectively provided on both side faces of the base portion 51 in the Y direction as shown in FIG. 6.

As shown in an enlarged view in FIG. 6, each of the guiding portions 54 of the present exemplary embodiment is configured by a first guiding portion 55, a second guiding portion 56 and a transitional portion 57. These portions are provided in the following order from the tip portion of the cleaning member 50: the first guiding portion 55, the transitional portion 57 and the second guiding portion 56. When the cleaning member 50 is inserted through the insertion opening 60, these portions guide a position of the cleaning member 50 in the Z direction while being in contact with the corresponding one of the receiving portions 63 of the insertion opening 60 in the above order.

The first guiding portion 55 is operable to guide a position of the cleaning member 50 in the Z direction so that one end side (the protection member 53 in the present exemplary embodiment) of the cleaning member 50 may be kept out of contact with an end portion (the flange member 12b in the present exemplary embodiment) of the photoconductive drum 12. The first guiding portion 55 includes: a first upper guiding face 55a that faces toward the photoconductive drum 12 in a state where the cleaning member 50 is inserted through the insertion opening 60; and a first lower guiding face 55b that faces toward the LPH 14 in a state where the cleaning member 50 is inserted through the insertion opening 60. When the cleaning member 50 is inserted through the insertion opening 60, the first upper guiding face 55a comes in contact with the first contact face 631 of the receiving portion 63, and the first lower guiding face 55b comes in contact with the second contact face 632 of the receiving portion 63.

In the present exemplary embodiment, a distance between the first upper guiding face 55a and the first lower guiding face 55b is set substantially equal to a distance between the first contact face 631 and the second contact face 632 of the receiving portion 63 formed in the insertion opening 60. By thus being configured, the receiving portion 63 of the insertion opening 60 and the first guiding portion 55 of the cleaning member 50 fit together, whereby the cleaning member 50 is guided without being wobbled.

The second guiding portion 56 is operable to guide a position of the cleaning member 50 in the Z direction so that the blade 52 of the cleaning member 50 may come in contact with the light-emitting face of the rod lens array 43 of the LPH 14. The second guiding portion 56 includes: a second upper guiding face 56a that faces toward the photoconductive drum 12 in a state where the cleaning member 50 is inserted through the insertion opening 60; and a second lower guiding face 56b that faces toward the LPH 14 in a state where the cleaning member 50 is inserted through the insertion opening 60. When the cleaning member 50 is inserted through the insertion opening 60, the second upper guiding face 56a comes in contact with the first contact face 631 of the receiving portion 63, and the second lower guiding face 56b comes in contact with the second contact face 632 of the receiving portion 63.

Note that a distance between the second upper guiding face 56a and the second lower guiding face 56b is set substantially equal to a distance between the first contact face 631 and the second contact face 632 of the receiving portion 63 formed in the insertion opening 60.

Additionally, when viewed from the protection member 53, a forming position of the second guiding portion 56 is different from that of the first guiding portion 55. Specifically, the second guiding portion 56 is formed so as to be more apart from the protection member 53 than the first guiding portion 55 in the Z direction. Consequently, as shown in the enlarged view in FIG. 6, a level difference is generated between the first guiding portion 55 and the second guiding portion 56.

The transitional portion 57 is operable to bridge the above described level difference between the first guiding portion 55 and the second guiding portion 56, and, as shown in the enlarged view in FIG. 6, is sloped. In the present exemplary embodiment, the first guiding portion 55, the transitional portion 57 and the second guiding portion 56 are inserted into the insertion opening 60 in that order. For this reason, the transitional portion 57 is provided between the first guiding portion 55 and the second guiding portion 56 so that the cleaning member 50 is inserted through the insertion opening 60 with a smooth transition from the first guiding portion 55 to the second guiding portion 56 between which the level difference exists.

The transitional portion 57 includes an upper transitional face 57*a* and a lower transitional face 57*b* as shown in the enlarged view in FIG. 6. The upper transitional face 57*a* is sloped from the first upper guiding face 55*a* to the second upper guiding face 56*a* so as to connect the first upper guiding face 55*a* and the second upper guiding face 56*a*. On the other hand, the lower transitional face 57*b* is sloped from the first lower guiding face 55*b* to the second lower guiding face 56*b* so as to connect the first lower guiding face 55*b* and the second lower guiding face 56*b*.

The grip portion 58 is provided to the cleaning member 50 at the end portion which is opposite to the tip portion of the cleaning member 50. The grip portion 58 is a part by use of which the cleaning member 50 is gripped. Insertion of the cleaning member 50 through the insertion opening 60, movement of the blade 52 on the rod lens array 43 of the LPH 14, pulling out of the cleaning member 50 from the insertion opening 60, and the like are carried out with this grip portion 58 being gripped.

Note that, in the present exemplary embodiment, the first upper guiding face 55*a* and the second lower guiding face 56*b* function as a first guiding face and a second guiding face, respectively. Additionally, the first contact face 631 and the second contact face 632 function as a first receiving face and a second receiving face, respectively.

Figure 7A:
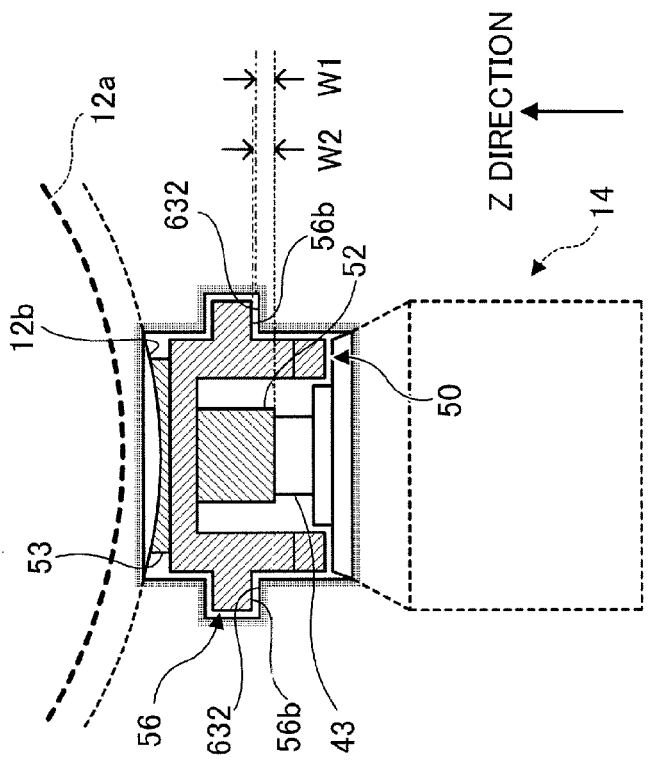
FIGS. 7A and 7B are views for explaining a positional relationship between the cleaning member inserted through the insertion opening and each of other members.
Figure 7B:
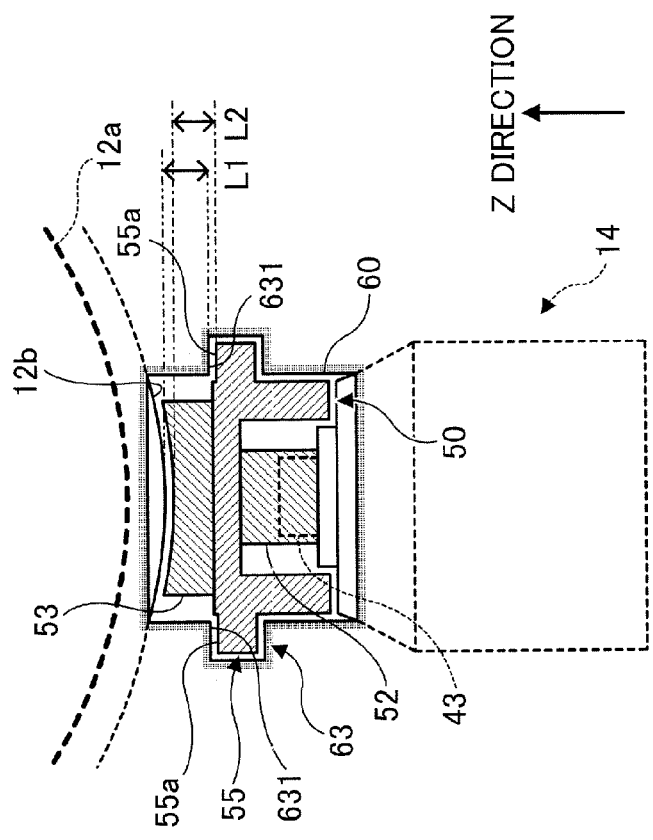

FIGS. 7A and 7B are views for explaining a positional relationship between the cleaning member 50 inserted through the insertion opening 60 and each of other members. Note that FIG. 7A is a partial cross-sectional view, which is viewed from the direction of the arrow A shown in FIG. 2, in a state where the first guiding portion 55 comes in contact with the receiving portion 63. FIG. 7B is a partial cross-sectional view, which is viewed from the direction of the arrow A shown in FIG. 2, in a state where the second guiding portion 56 comes in contact with the receiving portion 63.

In the present exemplary embodiment, the first guiding portion 55 is provided so that the protection member 53 of the cleaning member 50 may be kept out of contact with the flange member 12*b* of the photoconductive drum 12. Consequently, a forming position of the first guiding portion 55 of the cleaning member 50 in the Z direction is specified as a position allowing a clearance to be generated between the protection member 53 and the flange member 12*b* in a state where the first guiding portion 55 of the cleaning member 50 is inserted into the insertion opening 60.

As shown in FIG. 7A, in the state where the first guiding portion 55 is inserted into the insertion opening 60, the first contact face 631 of the receiving portion 63, which faces toward the LPH 14, and the first upper guiding face 55*a* of the first guiding portion 55, which faces toward the photoconductive drum 12, face each other. Consequently, movement of the cleaning member 50 in the Z direction toward the photoconductive drum 12 is restricted by the first contact face 631 that is a face facing toward the LPH 14. For this reason, in the present exemplary embodiment, the first guiding portion 55 is formed so that a distance L2 in the Z direction between the first upper guiding face 55*a* and an upper end portion (an end portion closer to the photoconductive drum 12) of the protection member 53 may be smaller than a distance L1 in the Z direction between the first contact face 631 and the flange member 12*b*.

Additionally, a forming position (refer to FIG. 6) of the first guiding portion 55 in the X direction is specified in the following manner. The present exemplary embodiment aims at keeping the protection member 53, which is provided in the cleaning member 50, out of contact with the flange member 12*b* of the photoconductive drum 12 when the cleaning member 50 is inserted through the insertion opening 60. In the present exemplary embodiment, the receiving portions 63, which determine a position of the cleaning member 50 while being in contact with the first guiding portions 55, are formed in the insertion opening 60. Therefore, it is only necessary that each of the first guiding portions 55 be formed on a part of the side face of the base portion 51, the part passing through the insertion opening 60 until the protection member 53 finishes passing by the flange member 12*b* at the insertion of the cleaning member 50 through the insertion opening 60.

Next, a forming position of the second guiding portion 56 in the Z direction will be described. The second guiding portion 56 is formed so that, after the protection member 53 finishes passing by the flange member 12*b*, a lower end (an end portion closer to the LPH 14) of the blade 52 of the cleaning member 50 may come in contact with the light-emitting face of the rod lens array 43 of the LPH 14. Consequently, the forming position of the second guiding portions 56 in the cleaning member 50 in the Z direction is specified so that the lower end of the blade 52 may come in contact with the light-emitting face of the rod lens array 43.

As shown in FIG. 7B, in the state where the second guiding portion 56 is inserted into the insertion opening 60, the second contact face 632 facing toward the photoconductive drum 12, and the second lower guiding face 56*b* of the second guiding portion 56, which faces toward the LPH 14, face each other. Consequently, movement of the cleaning member 50 in the Z direction toward the LPH 14 is restricted by the second contact face 632 that is a face facing toward the photoconductive drum 12. For this reason, the forming position of the second guiding portion 56 is specified by determining a distance W2 in the Z direction between the second lower guiding face 56*b* and the lower end portion (the end portion closer to the LPH 14) of the blade 52 relative to a distance W1 in the Z direction between the second contact face 632 and the light-emitting face of the rod lens array 43. In the present exemplary embodiment, the second guiding portion 56 is formed so that the above distances W1 and W2 may become substantially the same.

FIGS. 8A to 8C and 9A to 9C are views for explaining a cleaning procedure performed by the cleaning member 50 on the LPH 14.

Figure 8A:
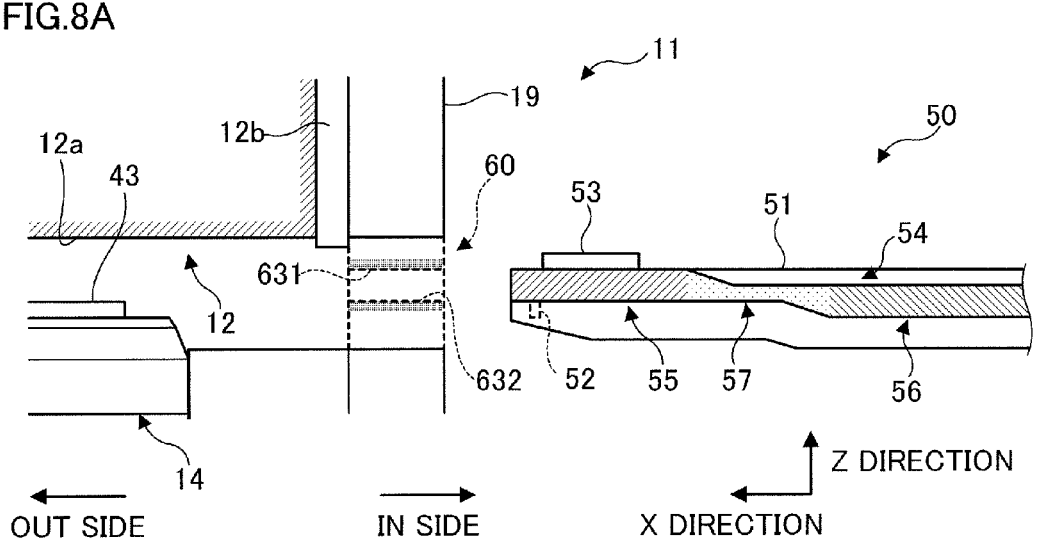
FIGS. 8A to 8C are views for explaining a cleaning procedure performed by the cleaning member on the LPH.

As shown in FIG. 8A, the tip portion of the cleaning member 50 is caused to face the insertion opening 60 of the housing 19. More specifically, each of the first guiding portions 55 of the respective guiding portions 54 and the corresponding one of the receiving portions 63 (refer to FIG. 7A) of the insertion opening 60 are positioned so that the first guiding portions 55 may fit into the receiving portion 63.

Figure 8B:
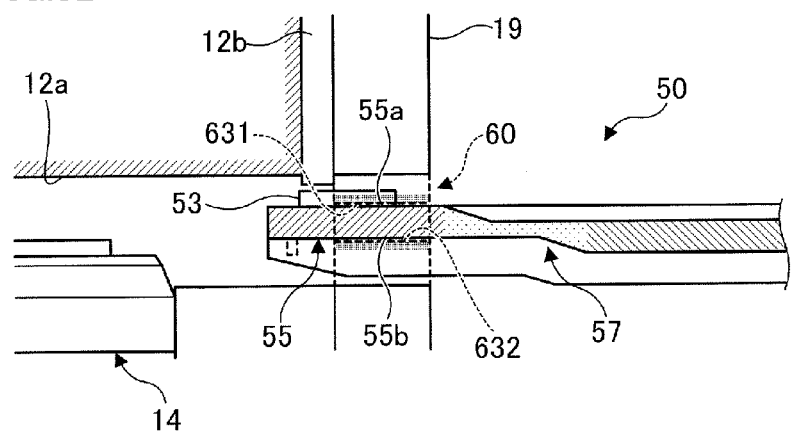

Then, the cleaning member 50 is inserted into the insertion opening 60. Thereby, in the first place, as shown in FIG. 8B, the first guiding portion 55 comes in contact with the receiving portion 63. At this time, the first upper guiding face 55*a* of the first guiding portion 55 and the first contact face 631 of the receiving portion 63 come in contact with each other, and the first lower guiding face 55*b* and the second contact face 632 come in contact with each other. Among these contact states, contact of the first upper guiding face 55*a* with the first contact face 631 prevents the cleaning member 50 from moving further toward the photoconductive drum 12 in the Z direction. A positional relationship at this time in the Z direction between the cleaning member 50 and the photoconductive drum 12 is set so that the protection member 53 may be kept out of contact with the flange member 12b. Additionally, this contact state continues until the first guiding portion 55 finishes passing through the insertion opening 60. Consequently, the protection member 53 is kept out of contact with the flange member 12b until the protection member 53 finishes passing by the flange member 12b.

Figure 8C:
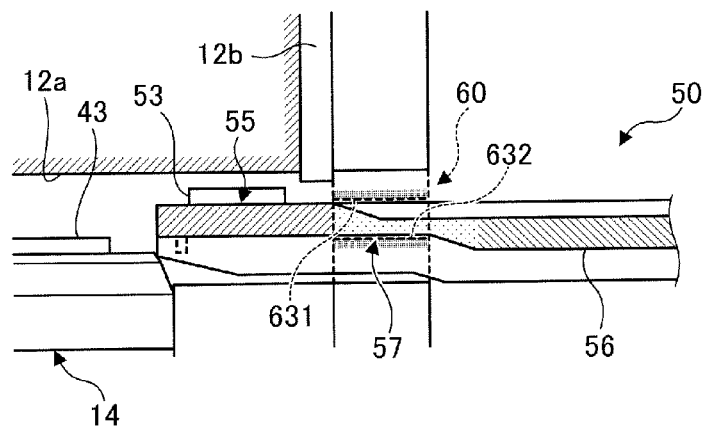

Then, as shown in FIG. 8C, when the cleaning member 50 is further thrust toward the OUT side, the transitional portions 57 of the cleaning member 50 reach the insertion opening 60. Note that, at this stage, the protection member 53 of the cleaning member 50 has already finished passing through the insertion opening 60.

Figure 9A:
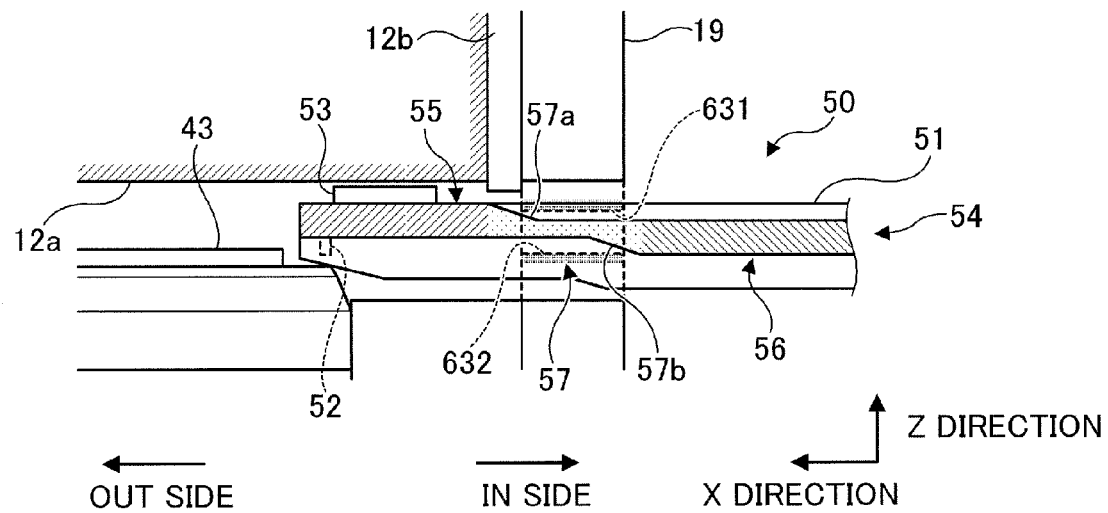
FIGS. 9A to 9C are views for explaining a cleaning procedure performed by the cleaning member on the LPH.

Then, if the cleaning member 50 is thrust toward the OUT side after the transitional portions 57 reach the insertion opening 60, the lower transitional face 57b of each of the transitional portions 57 is pressed against the second contact face 632 of the corresponding one of the receiving portions 63 as shown in FIG. 9A. The lower transitional face 57b is sloped toward the second lower guiding face 56b of the second guiding portion 56. For this reason, when the cleaning member 50 is thrust inward with the lower transitional face 57b keeping in contact with the second contact face 632, the tip portion of the cleaning member 50 gradually starts to move toward the photoconductive drum 12 in the Z direction.

Figure 9B:
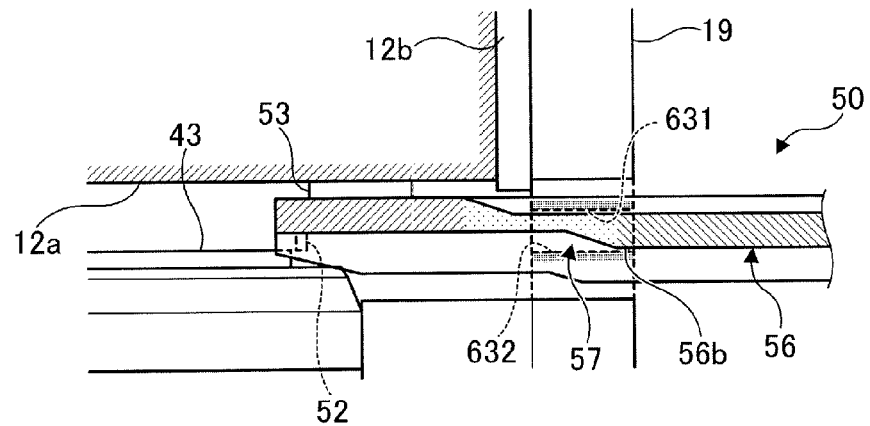

Then, after the transitional portion 57 of the cleaning member 50 finishes passing through the insertion opening 60, the cleaning member 50 is further thrust toward the OUT side. Then, as shown in FIG. 9B, the second guiding portions 56 of the cleaning member 50 reach the insertion opening 60. At this time, the second upper guiding face 56a of each of the second guiding portions 56 and the first contact face 631 of the corresponding one of the receiving portions 63 come in contact with each other, and the second lower guiding face 56b thereof and the second contact face 632 thereof come in contact with each other. Among these contact states, contact of the second lower guiding face 56b with the second contact face 632 allows the lower end portion of the blade 52 of the cleaning member 50 to come to a position where the lower end portion thereof is in contact with the light-emitting face of the rod lens array 43 of the LPH 14. Additionally, in the present exemplary embodiment, the protection member 53 comes in contact with a surface (the photoconductive base 12a) of the photoconductive drum 12.

Figure 9C:
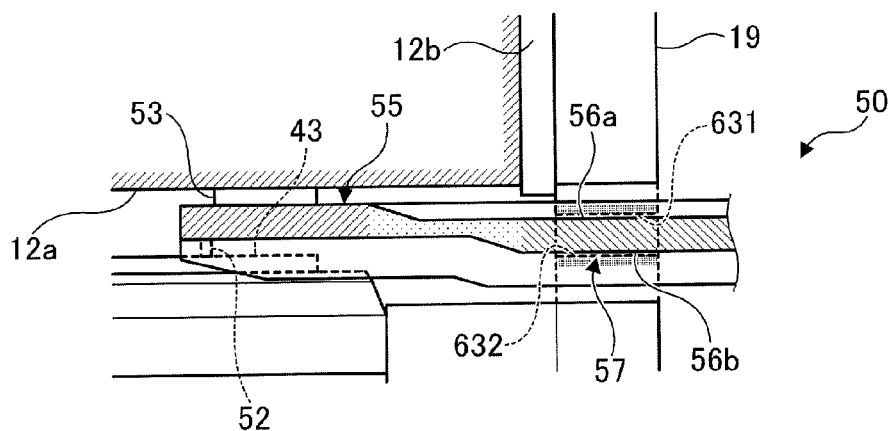

Then, as shown in FIG. 9C, adhesion material, such as toner, having adhered onto the light-emitting face of the rod lens array 43 is removed by moving the cleaning member 50 toward an end portion of the LPH 14 in the OUT side with the blade 52 keeping in contact with the rod lens array 43.

Note that, when the cleaning member 50 is pulled out from the insertion opening 60, a positional relationship between the cleaning member 50 and each of the other members is opposite to the positional relationship therebetween in movements thereof described with reference to FIGS. 8A to 8C and 9A to 9C. For example, the cleaning member 50 is pulled out toward the IN side in a state where the second guiding portions 56 are in contact with the receiving portions 63 of the insertion opening 60. Thereby, the transitional portions 57 reach the receiving portions 63 of the insertion opening 60. Then, the upper transitional face 57a of each of the transitional portions 57 is pressed against the first contact face 631 of the corresponding one of the receiving portions 63. As the cleaning member 50 is pulled out with the upper transitional face 57a keeping in contact with the first contact face 631, the tip portion of the cleaning member 50 gradually starts to move toward the LPH 14 in the Z direction.

Then, the first guiding portions 55 of the cleaning member 50 reach the insertion opening 60. At this time, as the cleaning member 50 is pulled toward the IN side along the X direction, the protection member 53 of the cleaning member 50 and the flange member 12b become closer and closer to each other in the X direction. In the Y direction, however, the first upper guiding face 55a keeps in contact with the first contact face 631, whereby the protection member 53 and the flange member 12b are prevented from becoming closer to each other. Consequently, the present exemplary embodiment is configured so that the cleaning member 50 may be pulled out from the insertion opening 60 without bringing the protection member 53 into contact with the flange member 12b.

Additionally, in the above-mentioned exemplary embodiment, the receiving portions 63 are configured as grooves formed in the insertion opening 60, and the guiding portions 54 are configured by provision of linear projections to the side faces of the base portion 51. However, forms of the receiving portions 63 and the guiding portions 54 are not limited to the above configurations. That is, in order to restrict movement of the cleaning member 50 in the Z direction toward the photoconductive drum 12, it is only necessary that: a face (the first contact face 631) facing toward the LPH 14 be formed in each of the receiving portions 63; and a face (the first upper guiding face 55a) facing toward the photoconductive drum 12, which comes in contact with the foregoing face of the receiving portion 63, be provided in the cleaning member 50. Consequently, the above-mentioned faces may be formed in the receiving portions 63 and the cleaning member 53 through a configuration in which, while the receiving portions 63 are formed as linear projections formed in the insertion opening 60, the guiding portions 54 are formed as grooves formed on the side faces of the base portion 51.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
  an image carrier;
  an exposure head that is provided along a longitudinal direction of the image carrier, and exposes the image carrier;
  a housing that holds the exposure head;
  an opening portion that is formed in the housing,
    wherein the exposure head and the image carrier face each other, and
    the opening portion is provided at an end portion in a longitudinal direction of a space in which the exposure head and the image carrier face each other;
  a receiving portion that is provided in the housing;
  a cleaning member comprising:
    a body portion;
    a cleaning portion that cleans a light-emitting face of the exposure head by moving while keeping in contract with the light-emitting face;
    a protection portion that is attached on a surface of the body portion in a way that the protection portion faces the image carrier;

and
a guiding portion that comes in contact with the receiving portion and guides the cleaning portion toward a space between the image carrier and the exposure head when the cleaning portion is inserted into an interior of the housing through the opening portion,
wherein the protection portion contacts with a base part of the image carrier when the cleaning portion cleans the light-emitting face of the exposure head.

2. The image forming apparatus according to claim 1, wherein:
the receiving portion includes a first receiving face that is a face facing toward the exposure head;
the guiding portion includes a first guiding face that is a face facing toward the image carrier; and
movement of a portion on the one end side of the cleaning member toward the image carrier is restricted by bringing the first guiding face of the guiding portion into contact with the first receiving face of the receiving portion.

3. The image forming apparatus according to claim 2, wherein:
the first guiding face of the guiding portion keeps in contact with the first receiving face of the receiving portion until the protection portion finishes passing by an end portion of the image carrier.

4. The image forming apparatus according to claim 1, wherein:
the receiving portion includes a second receiving face that is a face facing toward the image carrier;
the guiding portion includes a second guiding face that is a face facing toward the exposure head; and
the cleaning portion of the cleaning member is guided toward the space between the image carrier and the exposure head by bringing the second guiding face of the guiding portion into contact with the second receiving face of the receiving portion and restricting movement of a portion on the one end side of the cleaning member toward the image carrier.

5. The image forming apparatus according to claim 1, wherein the receiving portion is formed in the opening portion.

6. A cleaning member for an exposure head comprising:
a base that has one end and a different end, and is inserted from a one end side where the one end is located, through an opening formed in a which holds an exposure head facing an image carrier, toward a space between the image carrier and the exposure head,
wherein the opening is provided at an end portion in a longitudinal direction of the space;
a body portion;
a cleaning portion that cleans a light-emitting face of the exposure head by moving while keeping in contract with the light-emitting face;
a protection portion that is attached on a surface of the body portion in a way that the protection portion faces the image carrier;
and
a guiding portion that is provided to the base, and that guides the cleaning portion toward the space between the image carrier and the exposure head when the base is inserted through the opening,
wherein the protection portion contacts with a base part of the image carrier when the cleaning portion cleans the light-emitting face of the exposure head.

7. The cleaning member for the exposure head according to claim 6, wherein the guiding portion guides the cleaning portion so that the cleaning portion may come in contact with the light-emitting face of the exposure head after a portion on the one end side of the base passes by an end portion of the image carrier.

8. The cleaning member for the exposure head according to claim 7, wherein the guiding portion guides the base so that, while the portion on the one end side of the base passes by the end portion of the image carrier, a clearance may be maintained between the image carrier and the portion on the one end side of the base, and so that, after the portion on the one end side of the base passes by the end portion of the image carrier, the portion on the one end side of the base may move toward the image carrier.

9. The image forming apparatus according to claim 1, wherein:
the guiding portion guides an end portion of the cleaning member so that the end portion of the cleaning member may move toward the image carrier.

10. The cleaning member for the exposure head according to claim 6, wherein:
the guiding portion guides an end portion of the base so that the end portion of the base may move toward the image carrier.

* * * * *